United States Patent
Li et al.

(10) Patent No.: US 9,218,231 B2
(45) Date of Patent: Dec. 22, 2015

(54) DIAGNOSING A PROBLEM OF A SOFTWARE PRODUCT RUNNING IN A CLOUD ENVIRONMENT

(71) Applicant: INTERNATIONAL BUSINESS MACHINES CORPORATION, Armonk, NY (US)

(72) Inventors: Jun Hong Li, Beijing (CN); Yong Ni, Beijing (CN); Ai Jie Niu, Beijing (CN); Hai Tao Wang, Beijing (CN); Wen Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 14/059,903

(22) Filed: Oct. 22, 2013

(65) Prior Publication Data

US 2014/0122935 A1 May 1, 2014

(30) Foreign Application Priority Data

Oct. 30, 2012 (CN) .......................... 2012 1 0424375

(51) Int. Cl.
 *G06F 11/00* (2006.01)
 *G06F 11/07* (2006.01)

(52) U.S. Cl.
 CPC .......... *G06F 11/0709* (2013.01); *G06F 11/079* (2013.01); *G06F 11/0784* (2013.01)

(58) Field of Classification Search
 CPC ... H04L 45/22; G06F 11/261; G06F 11/3648; G06F 11/3656; G06F 11/3636
 See application file for complete search history.

(56) References Cited

U.S. PATENT DOCUMENTS

| | | | |
|---|---|---|---|
| 7,496,783 B1 * | 2/2009 | Graf et al. ..................... | 714/4.11 |
| 7,769,864 B2 | 8/2010 | Gebhart et al. | |
| 8,418,000 B1 * | 4/2013 | Salame ................ | G06F 11/079 714/26 |
| 8,745,397 B2 * | 6/2014 | Letca et al. .................... | 713/176 |
| 8,769,083 B2 * | 7/2014 | Ferris et al. .................... | 709/224 |
| 2004/0153764 A1 | 8/2004 | Paradkar | |
| 2008/0244325 A1 | 10/2008 | Tyulenev | |
| 2009/0150291 A1 | 6/2009 | Anson | |
| 2010/0199042 A1 * | 8/2010 | Bates ..................... | H04L 67/289 711/114 |
| 2010/0332629 A1 * | 12/2010 | Cotugno ............... | G06F 9/5072 709/221 |
| 2011/0055377 A1 | 3/2011 | Dehaan | |

(Continued)

OTHER PUBLICATIONS

Corporate Overview—Replay Solutions: Increasing the Efficiency and Effectiveness of Application Lifecycle Management—http://www.replaysolutions.com/company/.

*Primary Examiner* — Amine Riad
(74) *Attorney, Agent, or Firm* — Roy W. Truelson; Grant A. Johnson

(57) ABSTRACT

The present invention provides a method for diagnosing a problem of a software product running in a cloud environment and a corresponding apparatus, the method comprising: receiving a problem in the operation of the monitored software product from a diagnosis agent deployed on a node in the cloud environment; capturing the cloud environment including the software product, and deploying the captured cloud environment in a diagnosis cloud, and the step comprising: deploying the image of each node of the cloud environment in the diagnosis cloud; and applying corresponding configuration data for a cluster system deployed in the cloud environment to configure each node in the diagnosis cloud. The method and apparatus of the present invention can diagnose problems of a software product running in a cloud environment, and rebuild the cloud environment to facilitate the diagnosis of the problems.

14 Claims, 10 Drawing Sheets

(56) References Cited

U.S. PATENT DOCUMENTS

| | | | |
|---|---|---|---|
| 2011/0197097 A1* | 8/2011 | Beaty | H04L 41/16 714/27 |
| 2011/0258609 A1 | 10/2011 | Maczuba | |
| 2012/0054551 A1 | 3/2012 | Gao et al. | |
| 2014/0298091 A1* | 10/2014 | Carlen et al. | 714/15 |
| 2014/0325116 A1* | 10/2014 | McKelvie et al. | 711/103 |
| 2014/0380087 A1* | 12/2014 | Jamjoom et al. | 714/4.11 |
| 2015/0100684 A1* | 4/2015 | Maes | G06F 11/3672 709/224 |

* cited by examiner

DIAGNOSING A PROBLEM OF A SOFTWARE PRODUCT RUNNING IN A CLOUD ENVIRONMENT

FIELD OF THE INVENTION

The present invention relates to cloud computing, more particularly, to a method and apparatus for diagnosing a problem of a software product running in a cloud environment.

BACKGROUND OF THE INVENTION

In a traditional software development phase, the testing team or automation testing framework runs all the test cases and reports software defects to the development team. Developers then start to diagnose the problems and try to fix them. For those defects which can only be reproduced in very special environments and related with various kinds of system configuration parameters, environment variables, and various contextual runtime information, first of all developers need to set up an identical environment to reproduce those defects. In most cases, it takes very huge efforts to set up such a kind of environments. Developers need to collect various types of customer/tester environment parameters; and use these parameters to set up a new environment, including installing the operating system of the same version, the target software product, patches and all the related software; adjusting the runtime parameters for building the whole environment (including, e.g., the operating system, JRE, etc.); continuously adjusting the trace levels for any possible related components to gradually collect the desired traces. During the above process, any human errors or slight negligence will cause the failure of problem reproduction, so as to prevent problem diagnosis. This obviously becomes a bottleneck in the process of defect fixing and increases the risk of product delivery in time. If this scenario happens in a customer's environment after that product's release, since developers have to work on the spot, and guide the customer to collect all the required information, this is time-consuming and costly for both parties, and the problem solving delay caused by reproducing the environment set will lead to invaluable loss of the customer's confidence on this product.

In addition, cluster systems, due to their advanced feature of high availability and huge business throughput, are becoming more and more popular and have been deployed in cloud environments. However, due to the complex environment factors, complex task scheduling or coordination among a plurality of nodes of a cluster system, it is more difficult to rebuild the cluster system to reproduce the problems. Moreover, the elasticity characteristic of a cloud supports scaling the cluster system to dynamically change the number of nodes, and thus it is very difficult to capture the instantaneous state of the cluster to rebuild the cluster system for reproducing the problems.

It can be seen that a solution for monitoring the operation of a software product in a cloud environment and rebuilding an operating environment of the software product for reproducing the problems in a cloud environment, so as to diagnose a problem of a software product is needed in the art.

SUMMARY OF THE INVENTION

In one aspect of the present invention, there is provided a method for diagnosing a problem of a software product running in a cloud environment, comprising: receiving a problem in the operation of the monitored software product from a diagnosis agent deployed on a node in the cloud environment; capturing the cloud environment including the software product, and deploying the captured cloud environment in a diagnosis cloud, comprising: deploying the image of each node of the cloud environment in the diagnosis cloud; and applying corresponding configuration data for a cluster system deployed in the cloud environment to configure each node in the diagnosis cloud.

In another aspect of the present invention, there is provided a method for diagnosing a problem of a software product running in a cloud environment, comprising: in response to a node joining the cloud environment, deploying a diagnosis agent on the node; the diagnosis agent determining whether a problem in the operation of the software product occurs; and in response to determining that a problem in the operation of the software product occurs, the diagnosis agent reporting to a diagnosis controller.

In yet another aspect of the present invention, there is provided an apparatus for diagnosing a problem of a software product running in a cloud environment, comprising: a receiving module configured to receive a problem in the operation of the monitored software product from a diagnosis agent deployed on a node in the cloud environment; a capturing and deploying module configured to capture the cloud environment including the software product, and deploy the captured cloud environment in a diagnosis cloud, and the capturing and deploying module comprises: a deploying module configured to deploy the image of each node of the cloud environment in the diagnosis cloud; and a configuring module configured to apply corresponding configuration data for a cluster system deployed in the cloud environment to configure each node in the diagnosis cloud.

In a further aspect of the present invention, there is provided an apparatus for diagnosing a problem of a software product running in a cloud environment, the apparatus comprising: a deploying module configured to, in response to a node joining the cloud environment, deploy a diagnosis agent on the node; a determining module configured to determine whether a problem in the operation of the software product occurs; and a reporting module configured to, in response to determining that a problem in the operation of the software product occurs, report to a diagnosis controller.

The present invention can automatically obtain problems in a software product in a cloud environment, and rebuild the cloud environment in a diagnosis cloud, so as to facilitate the problem reproduction and diagnosis.

BRIEF DESCRIPTIONS OF THE ACCOMPANYING DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 1 denotes a cloud computing node according to an embodiment of the present invention;

FIG. 2 denotes a cloud computing environment according to an embodiment of the present invention;

FIG. 3 denotes an abstract model layer according to an embodiment of the present invention;

FIG. 4 schematically shows an architecture of a system for diagnosing a problem of a software product running in a cloud environment according to some embodiments of the present invention;

FIG. 5 schematically shows an architecture of a system for diagnosing a problem of a software product running in a cloud environment according to some preferred embodiments of the present invention;

FIG. 6 schematically shows a process of capturing cluster nodes and deploying them in a diagnosis cloud according to some preferred embodiments of the present invention;

DETAILED DESCRIPTION OF SPECIFIC EMBODIMENTS

Figure 1:
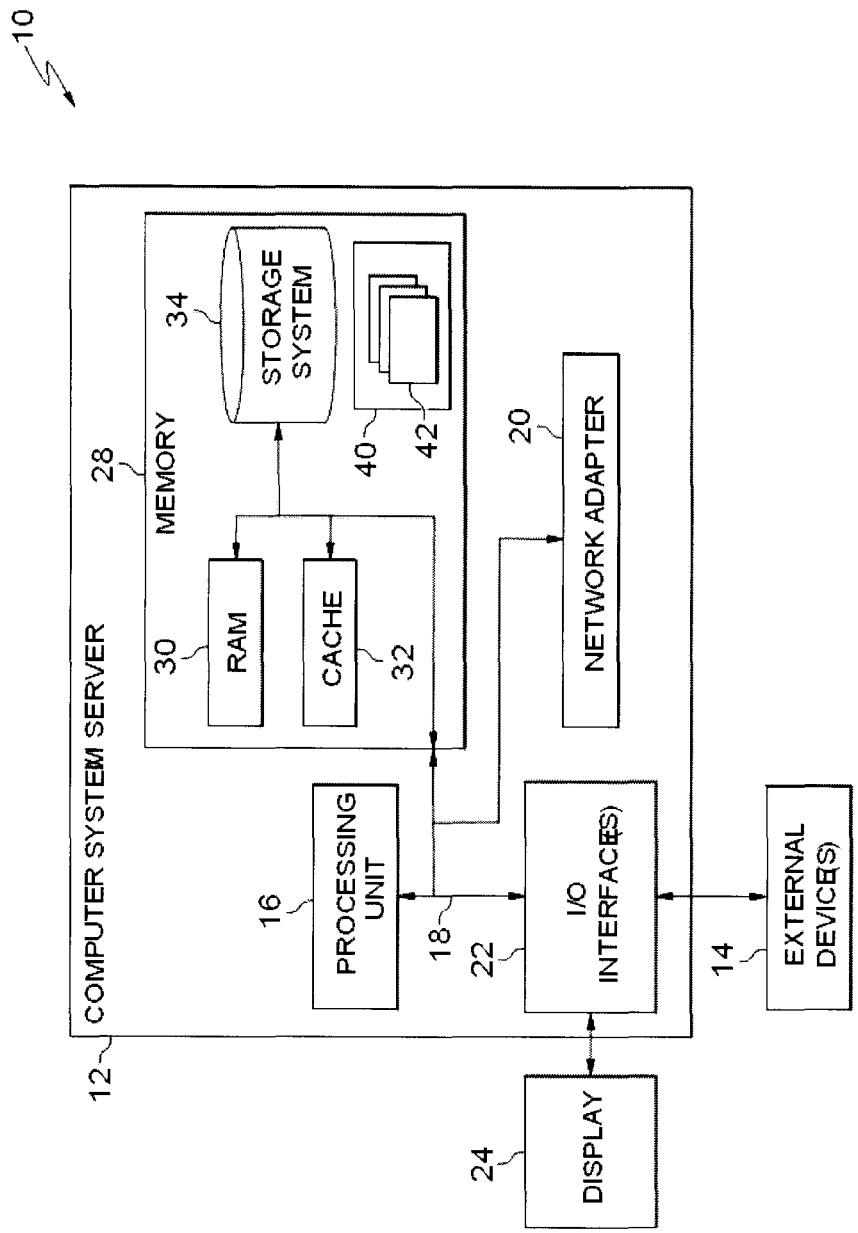

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
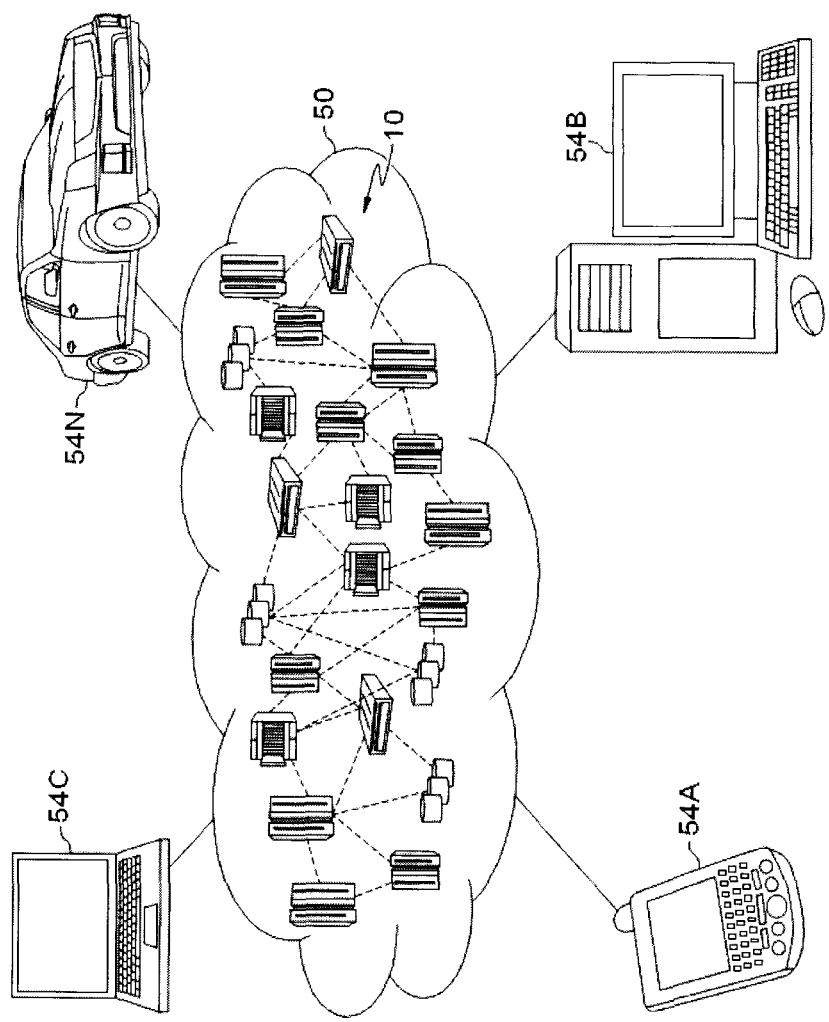

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
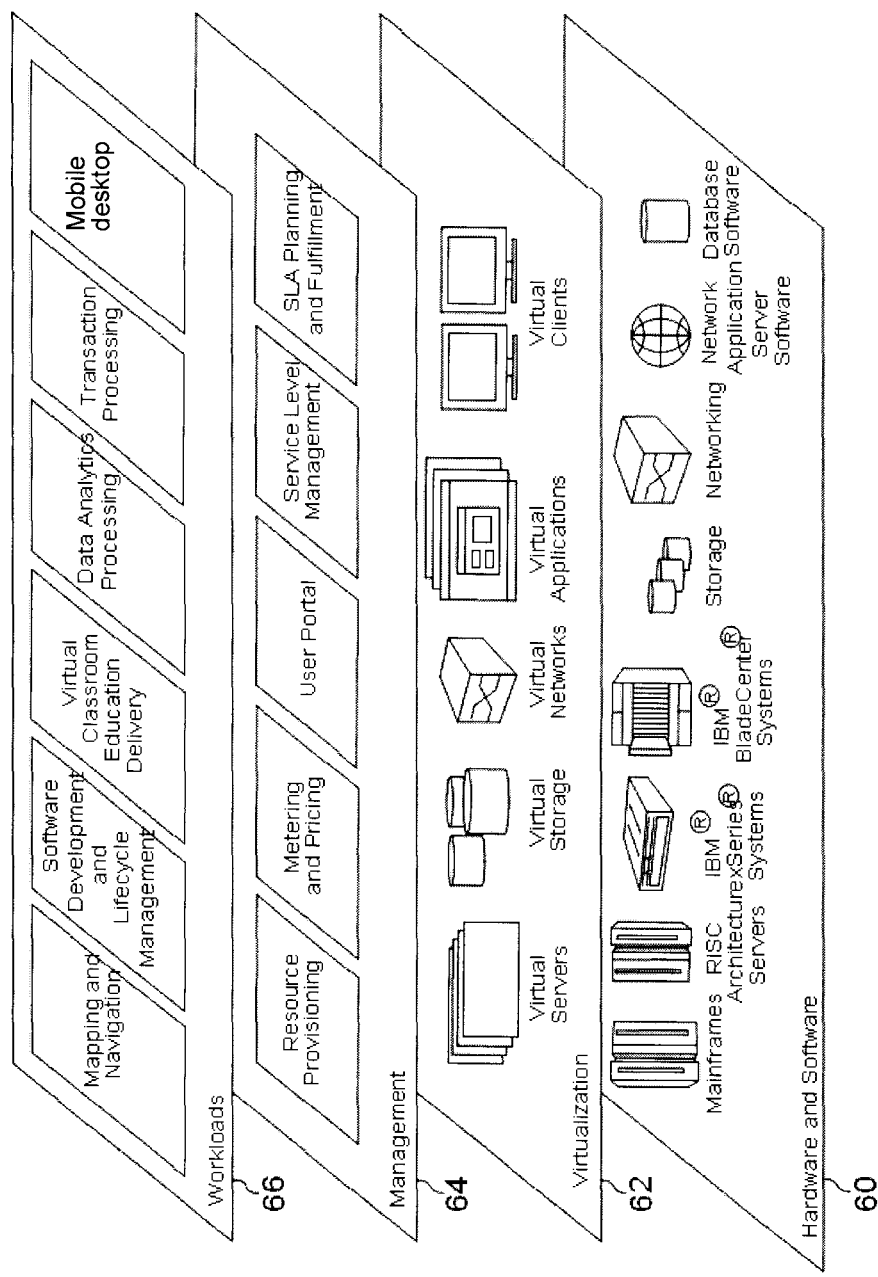

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
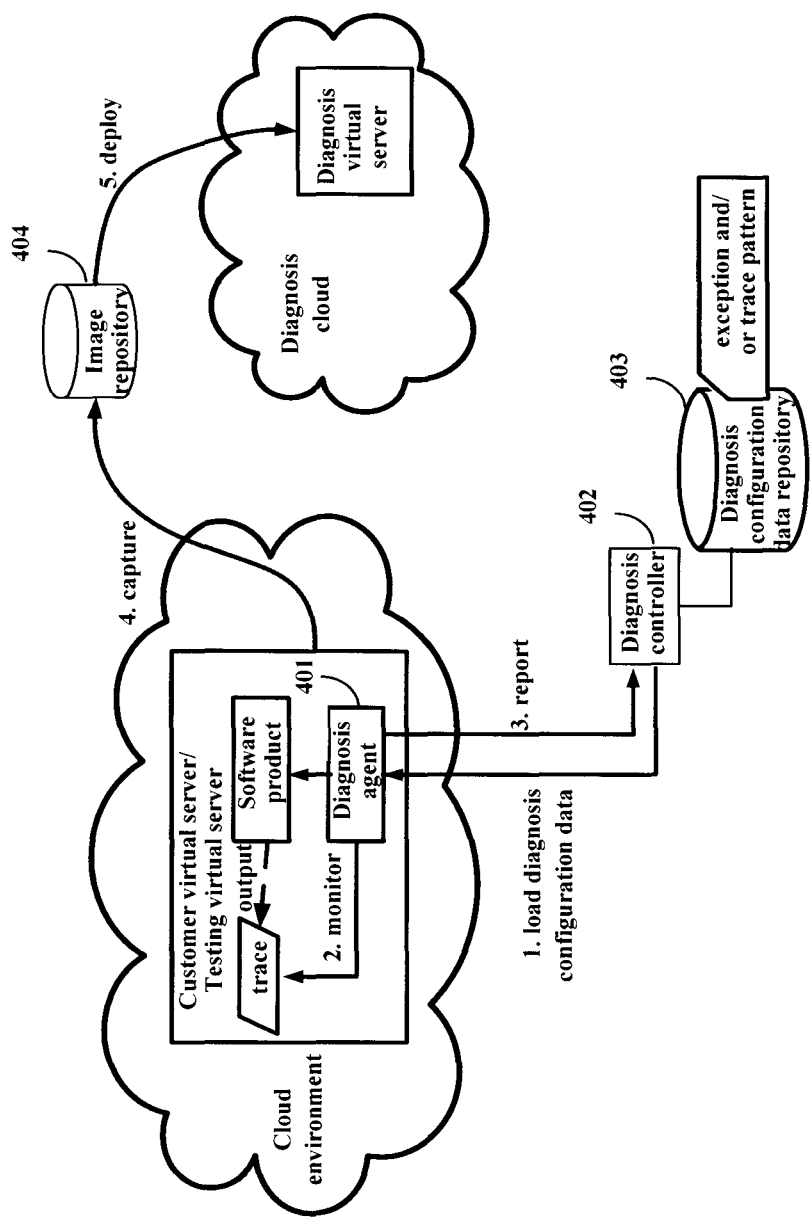

FIG. 4 schematically shows an architecture of a system for diagnosing a problem of a software product running in a cloud environment according to some embodiments of the present invention.

As shown, a diagnosis agent 401 is deployed in the cloud environment, and the diagnosis agent 401 may monitor the operation of a software product in real time to determine whether a problem in the operation of the software product occurs, and in response to determining that a problem in the operation of the software product occurs, the diagnosis agent 401 may report to a diagnosis controller 402. The diagnosis controller 402 may be external to the cloud environment. The cloud environment may comprise a testing cloud or a customer cloud. A testing cloud refers to a cloud environment in which testing of a software product is performed, while a customer cloud refers to a cloud environment in which a customer is using a software product and operates the software product.

Preferably, the diagnosis agent 401 may obtain diagnosis configuration data from the diagnosis controller 402, for example, and the diagnosis configuration data may preferably be configurable by a user and may include a trigger condition. The diagnosis configuration data may be stored in a diagnosis configuration repository 403 maintained by the diagnosis controller 402. The diagnosis agent 401 may determine whether a problem in the operation of the software product is really occurs by determining whether the output of the software product operation matches the trigger condition. The output of the software product operation may be traces/logs generated in the operation of the software product, or a generated exception. Correspondingly, the trigger condition may also include an exception and/or trace pattern in the operation of the software product.

The diagnosis controller 402 receives a report on a problem in the operation of the monitored software product from the diagnosis agent 401, analyzes the report and captures the entire environment (e.g., a customer virtual server image or a testing virtual server image) including the software product according to the analysis results, and deploys the environment in a diagnosis cloud, so as to reproduce the problem in the diagnosis cloud and perform diagnosis. The diagnosis controller 402 may first store the captured virtual server image in an image repository 404, and then deploy the virtual server stored in the image repository 404 in the diagnosis cloud.

As known by those skilled in the art, the above description actually discloses a method and corresponding apparatus for diagnosing a problem of a software product running in a cloud environment according to embodiments of the present invention. For simplicity, here they will not be described further.

Figure 5:
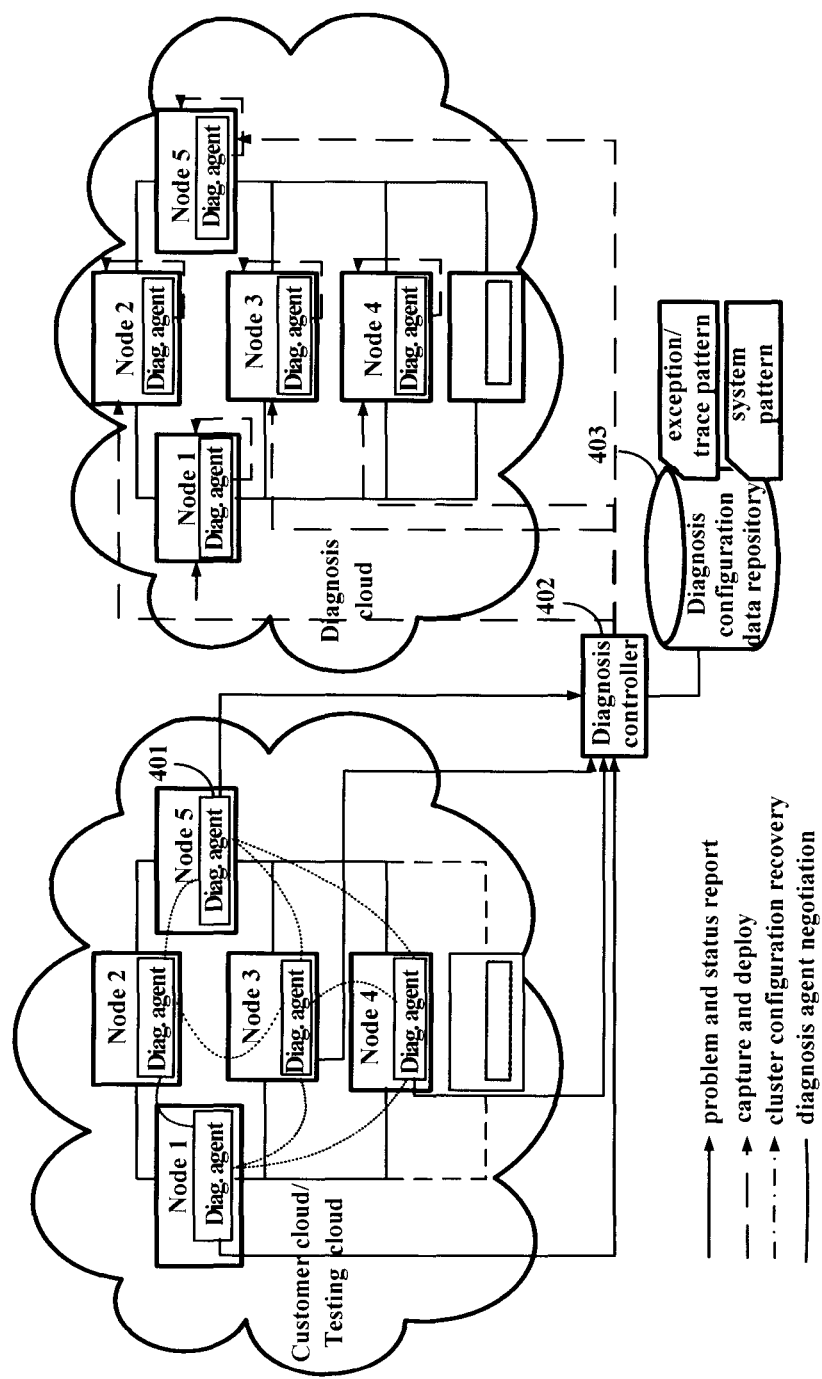

FIG. 5 schematically shows an architecture of a system for diagnosing a problem of a software product running in a more complex cloud environment according to some preferred embodiments of the present invention. As shown, the software product runs in a cluster system in a testing cloud or customer cloud. Each node of the cluster has a diagnosis agent 401 deployed. The diagnosis controller 402 communicates with the respective diagnosis agent 401s, in order to send diagnosis configuration information to the respective diagnosis agent 401, and receives problem reports and relevant information for configuring the cluster system from the respective diagnosis agent 401. All the diagnosis agents 401 may communicate with each other to exchange monitored diagnosis information, as well as configuration information for the cluster system. In addition, the diagnosis controller 402 is responsible for maintaining diagnosis configuration data in the diagnosis configuration database, in which action rules (including trigger conditions and actions) for the diagnosis agents 401 and diagnosis controller 402 that may be set by the user are included.

The diagnosis agent 401 in each node may be a program running in the background. The behavior of the diagnosis agent 401 may be customized by the diagnosis configuration data from the diagnosis controller 402. The diagnosis configuration data defines a trigger condition type, trigger condition and corresponding action. The action may be instruction code or script defined and stored in the diagnosis configuration database.

In most cases, the cluster system has many types of nodes. For example, in a typical enterprise application architecture, there are a web server node, an application server node, a database node. The web server node is responsible for receiving a request and forwarding the request to the application server node, and the application server node runs business logic and obtains data from the database node. Different types of nodes undertake different computing tasks and different levels of workload. Therefore, in an embodiment of the present invention, the diagnosis agent 401 on different nodes are configured with different trigger conditions and actions.

Compared with a traditional cluster system with a static cluster topology definition, a cluster in a cloud has dynamic elasticity. The cluster may be scaled by adding or removing nodes with the change of workload (which is also referred to as dynamic horizontal scaling). In an embodiment of the present invention, each diagnosis agent 401 has the p2p protocol, and has the capability to negotiate with diagnosis agents 401 on other nodes. When a new node joins the cluster, other nodes may be aware of it and communicate with it.

In an embodiment of the present invention, whenever a node is initiated, its diagnosis agent 401 may obtain the corresponding diagnosis configuration data from the diagnosis controller 402 according to its node type. The diagnosis agent 401 may load the diagnosis configuration data to the storage of the node. Then, the diagnosis agent 401 monitors the software and/or system data of the node and the log/trace of the application system, and analyzes the log/trace in real time. Meanwhile, the diagnosis agent 401 compares these monitored data, especially exception data (e.g., frequent insufficient storage, null pointer exception in key components, specific trace pattern, long time idleness of CPU, process deadlock, etc.), with the diagnosis configuration data in real time. Specifically for the data related to the trace pattern, the diagnosis agent 401 may compare by regular expression match or other syntax and semantic tools.

The diagnosis configuration data may be classified by node types by the diagnosis controller 402. For example, the diagnosis configuration data may be as follows:

In the above example, the action rules 001 and 002 are defined for the node type of "application server". The diagnosis agent 401 in the application server node continuously monitors the trace of the business application running on the application server. The business application running on the server has the capability to collect the number of business transactions it undertakes; if no business logic runs on it within several minutes, then it will output a warning in the trace. The warning indicates that the business application has been idle for a period of time, and this may mean that the entire cluster or the application itself has some error. Once the diagnosis agent 401 finds that the trace matches the pattern "[App] warning there is no business logic running within ${period} minutes in the server" (${period} is the number of minutes that can be set by the user), then the action designated by the action rule is taken. The actions in the above table may be commands or script files executable by the diagnosis agent 401. In the example, the action is a combination of a command or script, that is, the diagnosis agent 401 first talks with the diagnosis agents 401 on other nodes to know whether the same thing happens on the other nodes, and if yes, reports to the diagnosis controller 402.

The action rule 002 specifies a fatal runtime exception, e.g., NullPointerException (which occurs in some extremely huge workload), or some internally defined fatal exception (which may be generated by a programming bug triggered in a complex environment). The corresponding action is a command for submitting the log to the diagnosis controller 402.

For the web server node type, the action rule 003 specifies trace pattern match. Whenever the diagnosis agent 401 finds a trace matching the specified trace pattern, it will take the action of reporting to the diagnosis controller 402.

The diagnosis configuration data maintained by the diagnosis controller 402 may further include the diagnosis configuration data for configuring the diagnosis controller 402 itself. For example, such diagnosis configuration data may be shown as follows:

TABLE 1

| ID | Node type | Condition type | Trigger condition | Action |
|---|---|---|---|---|
| 001 | Application server | Trace pattern match | Match: "[App] warning: there is no business logic running within ${period} minutes in the server" | 1. Talk with other nodes. 2. if (more than two other nodes have the same trace pattern), then report to the diagnosis controller |
| 002 | Application server | Fatal exception | Match: Financial Settlement component (NullPointerException OR Exception ID: CYP0344E Exception ID: CYP1323E) | Submit the log to the diagnosis controller |
| 003 | Web server | Trace pattern match | Match: "when obtaining the application service, [Web] connection timed out" | Report to the diagnosis controller |

TABLE 2

| ID | Node type | Trace analysis strategy | Trigger condition | Action |
|---|---|---|---|---|
| 001 | Application server | Single node trace pattern match | Match: "[App] warning. there is no business logic running within ${period} minutes in the server" | 1. Record the reporting node ID 2. Instruct other nodes to report whether there is such match |
| 002 | Application server | Multi-node trace pattern match | 1. Current reporting node matches: "[App] warning: there is no business logic running within ${period} minutes in the server" 2. There have been more than 80% application server nodes matching: "[App] warning: there is no business logic running within ${period} minutes in the server" | This is an expected condition, and there is no need to take any action. |
| 003 | Application server | Multi-node trace pattern match | 1. Reporting node matches: "[App] warning: there is no business logic running within ${period} minutes in the server" 2. There have been more than 80% nodes matching: "[App] information: ${numbers} businesses have been processed within ${period} minutes" | Trigger capturing the cluster |

In the above diagnosis configuration data, three action rules are defined for the diagnosis controller 402. According to the action rule 001, when the diagnosis controller 402 receives a report on the trace pattern match "[App] warning: there is no business logic running within $ {period} minutes in the server", there may be two reasons: one is that there are few requests to system services, and thus most nodes are idle; the other is that most other nodes are busy, while a particular node is idle most of the time, in which case there must be some errors in the cluster or application itself. Therefore, the diagnosis controller 402 instructs other nodes to report whether they have such type of trace pattern match.

Once the diagnosis controller 402 receives reports from a plurality of nodes (e.g., all or most of the nodes), it uses the strategy of "multi-node trace pattern match" of the action rules 002 and 003. If there have been more than 80% nodes matching "[App] warning: there is no business logic running within $ {period} minutes in the server", and the reporting node matching "[App] warning: there is no business logic running within $ {period} minutes in the server", this means that the system is under low workload, and thus most nodes are idle. In such a case, there is no need to take any further action.

However, if there have been more than 80% nodes matching "[App] information: $ {numbers} businesses have been processed within $ {period} minutes", while a reporting node matches "[App] warning: there is no business logic running within $ {period} minutes in the server", this indicates that there must be some error. At this time, the cluster needs to be captured.

Apart from the diagnosis configuration data for the diagnostic agent and diagnosis controller 402, there is also system pattern metadata for customization of the entire cluster. The system pattern metadata comprises any relevant configuration data to construct the cluster system (e.g., data items in cluster configuration files, or some configuration records in a cluster database). For example, the system configuration metadata may be as shown in the following table.

TABLE 3

| Node ID | Node Type | Node Configuration Data | DB Configuration Data | Node Association Configuration Data |
|---|---|---|---|---|
| 001 | App server | [Server] CPU: 4 MEM: 4096 DISK: 100 GB IP: | [DB] Cluster DB definition AppServer DB definition | Cluster Manager: Peer nodes List: P2P connection info: (Or script to create these configurations) |

TABLE 3-continued

| Node ID | Node Type | Node Configuration Data | DB Configuration Data | Node Association Configuration Data |
|---|---|---|---|---|
| | | DNS: [Cluster Node] discovered peer nodes: cluster db connection: cluster messaging channel: (or script to construct these configurations on this cluster node) [App configuration] WAS configuration DB connection App configuration (or script to create the these configurations) | Application DB definition (or script(like shell or python) to create the db configurations) | |
| 002 | Cluster Manager Node | [Server] CPU: 4 MEM: 4096 DISK: 100 GB IP: DNS: [Cluster Mgr] cluster db connection: cluster messaging channel: (or script to construct these configurations) | [DB] Cluster DB definition AppServer DB definition (or a script(like shell or python) to create the db configuration) | cluster members: P2P connection info: (Or script to create these configuration) |

The diagnosis agent 401 will dynamically collect such system pattern metadata for each node, and sends it to the diagnosis controller 402. The diagnosis controller 402 collects and combines the system pattern metadata of all the nodes to form a system pattern. Different from the conventional static system pattern deployment, the system pattern in a cloud environment changes with the elastic scalability. Whenever a new node joins in, the diagnosis agent 401 thereon begins to collect its configuration, and communicates with other nodes and the cluster manager. The diagnosis agent 401 of the node sends its configurations to the diagnosis controller 402. Meanwhile, configuration data of other nodes may also change (e.g., the node manager may discover the cluster members and correspondingly change some cluster configurations), and these changes will be updated to the diagnosis controller 402.

When the diagnosis controller 402 decides to replicate the cluster according to the analysis on the reports from the diagnosis agents 401 (e.g., as determined according to the action rules in table 2), the diagnosis controller 402 initiates capturing the images of all the nodes. Then, for each node, there will be the captured image and corresponding configuration data (i.e., system pattern metadata), the image and configuration data can be used to deploy a new node which is the same as the original one. The diagnosis controller 402 initiates deploying the image of each node. After the image of every node is deployed, corresponding system pattern metadata (node configuration, cluster database configuration, node association configuration) of each node is configured and activated in the newly deployed nodes. Thus, the newly deployed nodes can use all these configurations, so as to form a new identical cluster system.

Figure 6:
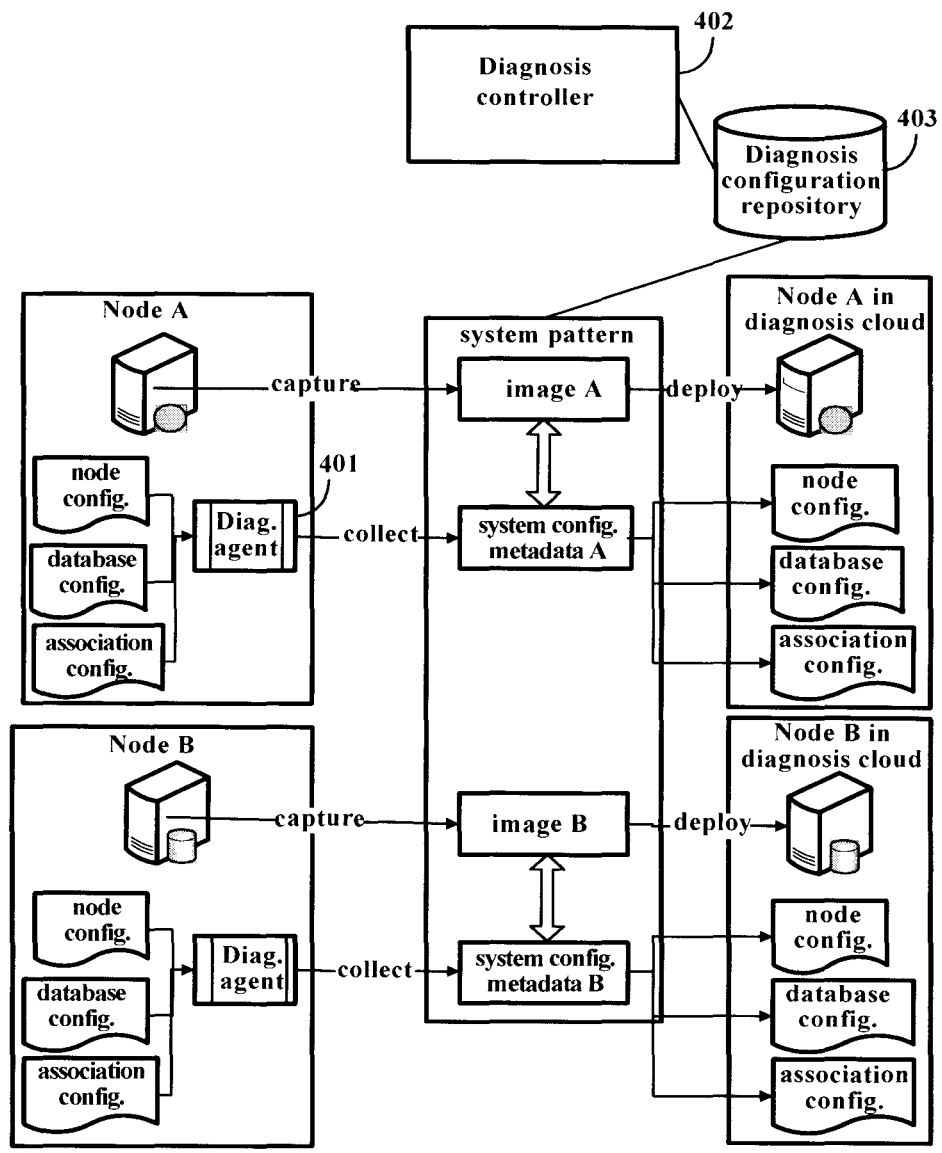

FIG. 6 schematically shows the process of capturing cluster nodes or deploying them in the diagnosis cloud according to some preferred embodiments of the present invention. As shown, the diagnosis controller 402 captures the images of node A and node B in the cluster, and in the meantime collects node configurations, database configurations and association configurations (i.e., system pattern metadata) from the diagnosis agents 401 on node A and node B, which node image and system pattern metadata may form a system pattern; then the node images are deployed into the diagnosis cloud, and the system pattern metadata of the respective nodes are deployed in the respective nodes in the diagnosis cloud, so as to build an identical cluster in the diagnosis cloud.

It should be pointed out that the above is merely an exemplary description of the specific embodiments of the present invention, rather than limitation to the present invention. The above description discloses numerous technical details, and specific embodiments of the present invention may exclude some of these technical details. In addition, as known by those skilled in the art, the above description actually discloses methods and apparatuses of some preferred embodiments of the present invention. For clarity, these methods and apparatuses will be described now in greater detail by referring to the accompanying drawings.

Figure 7:
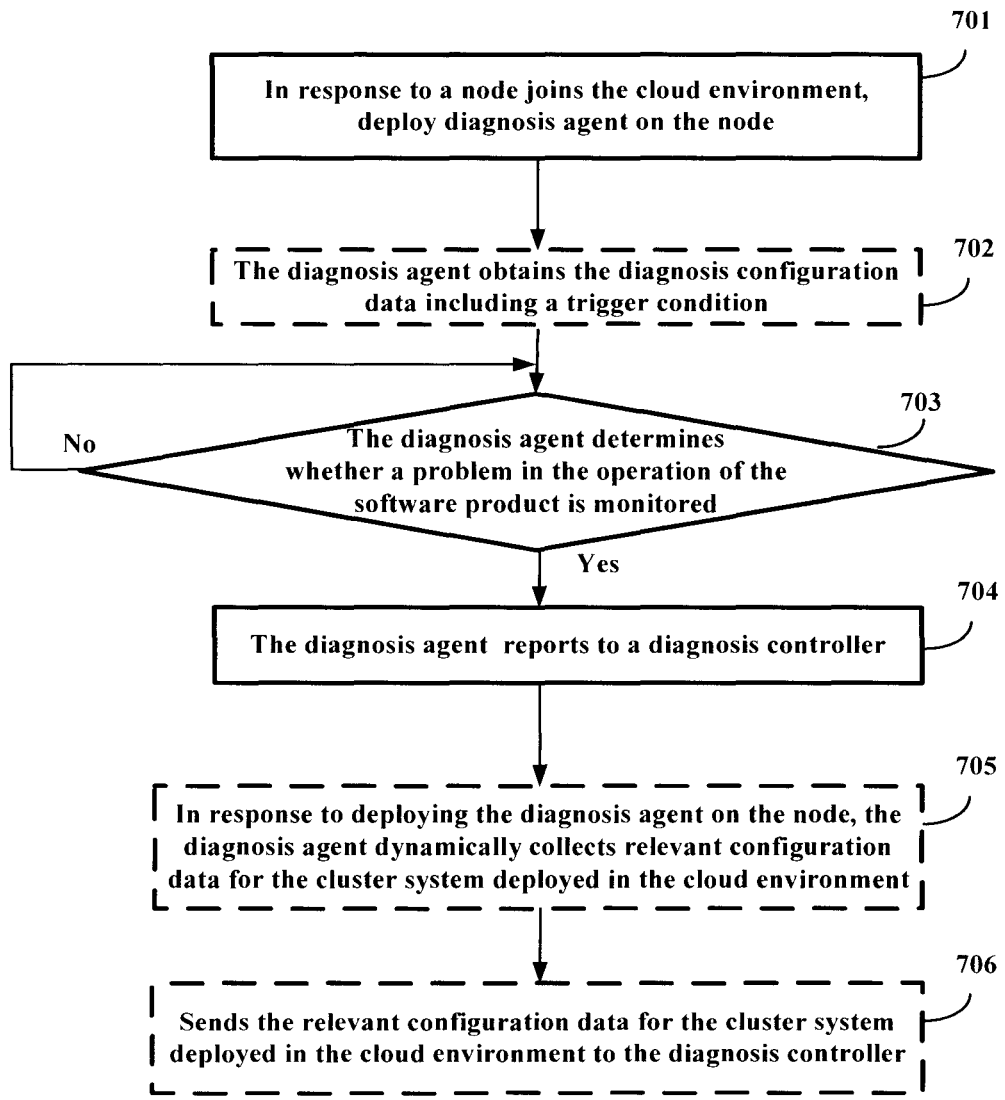
FIG. 7 shows a flow chart of a method for diagnosing a problem of a software product running in a cloud environment according to some preferred embodiments of the present invention.

FIG. 7 shows a flow chart of a method for diagnosing a problem of a software product running in a cloud environment according to some preferred embodiments of the present invention, wherein the software product runs in a cluster system in a testing cloud or customer cloud. The method may be executed by a diagnosis agent 401 deployed on each node in the cluster system. As shown, the method comprises the following steps:

In step 701, in response to a node joining the cloud environment, a diagnosis agent is deployed on the node.

In step 703, the diagnosis agent 401 determines whether a problem in the operation of the software product occurs.

In step 704, in response to determining that a problem in the operation of the software product occurs, the diagnosis agent 401 reports to a diagnosis controller 402. If in step 703 it is determined that no problem in the operation of the software product occurs, then the diagnosis agent 401 may return to step 704 to continue to determine whether a problem in the operation of the software product occurs.

According to an embodiment of the present invention, the method further comprises the following optional steps:

In optional step 705, in response to deploying the diagnosis agent on the node, the diagnosis agent 401 dynamically collects relevant configuration data for the cluster system deployed in the cloud environment. The relevant configuration data may be referred to as system pattern metadata. This step may be performed any time after step 701 and before step 706, and there is no limitation as to the execution order between this step and steps 702, 703 and 704.

In optional step 706, the diagnosis agent 401 sends the relevant configuration data for the cluster system deployed in the cloud environment to the diagnosis controller 402. The step may be performed after step 705, and there is no limitation as to the execution order between this step and steps 702, 703 and 704.

According to an embodiment of the present invention, the method further comprises the following optional step:

In optional step 702, the diagnosis agent 401 obtains the diagnosis configuration data including a trigger condition, and wherein the step 703 of the diagnosis agent 401 determining whether a problem in the operation of the software product occurs comprises: the diagnosis agent 401 determining whether the output of the software product operation matches the trigger condition.

Preferably, the diagnosis configuration data can be customized by users. The diagnosis configuration data may be stored in a diagnosis configuration repository 403 maintained by the diagnosis controller 402, so that the diagnosis agent 401 may obtain the diagnosis configuration data from the diagnosis configuration repository 403.

Preferably, the diagnosis configuration data may be classified according to node types, and thus, the diagnosis agents 401 in different types of nodes may obtain the diagnosis configuration data for the types of nodes respectively.

According to an embodiment of the present invention, the trigger condition includes an exception and/or trace pattern in the operation of the software product. Correspondingly, the output of the software product operation may include an exception generated and a trace or log outputted during the operation of the software product.

According to an embodiment of the present invention, the diagnosis configuration data further comprises an action corresponding to the trigger condition, and in response to determining that a problem in the operation of the software product occurs, the diagnosis agent 401 reporting to the diagnosis controller 402 further comprises: in response to determining that the output of the software product operation matches the trigger condition, executing the action corresponding to the matched trigger condition. That is to say, the action corresponding to the trigger condition as defined in the diagnosis configuration data is to report the problem to the diagnosis controller 402, and the problem is, e.g., an exception or trace pattern matching the trigger condition generated in the operation of the software product.

According to an embodiment of the present invention, in response to determining that a problem in the operation of the software product occurs, the diagnosis agent reporting to the diagnosis controller further comprises: communicating with diagnosis agents 401 on other nodes of the cloud environment to obtain the operation conditions of the software product monitored by the diagnosis agents 401 on other nodes. That is to say, the action corresponding to the trigger condition as defined in the diagnosis configuration data includes communicating with diagnosis agents 401 on other nodes so as to obtain the operation conditions of the software product on the other nodes monitored by the diagnosis agents 401. In addition, the action may further comprise determining the operation conditions of the software product on other nodes, and reporting to the diagnosis controller 402 according to the determination results.

According to an embodiment of the present invention, the relevant configuration data for the cluster system deployed in the cloud environment comprises: node configuration data, cluster database configuration data and node association configuration data. Of course, these data are merely exemplary, and the relevant configuration data for the cluster system deployed in the cloud environment may comprise any configuration data required for constructing the cluster system.

Figure 8:
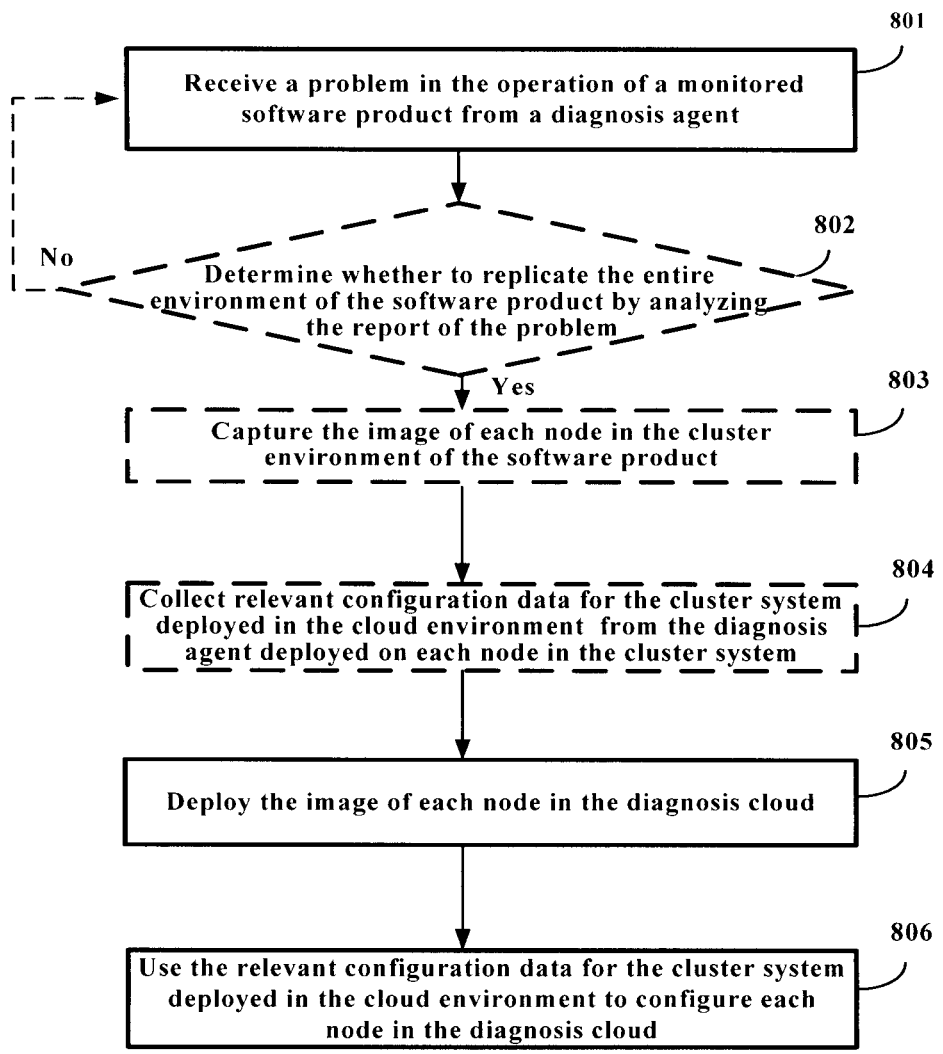
FIG. 8 shows a flow chart of a method for diagnosing a problem of a software product running in a cloud environment according to some other preferred embodiments of the present invention.

FIG. 8 shows a flowchart of a method for diagnosing a problem of a software product running in a cloud environment according to some preferred embodiments of the present invention, wherein the software product runs in a cluster system in a testing cloud or customer cloud. The method may be executed by the diagnosis controller 402. As shown, the method comprises the following steps:

In step 801, a problem in the operation of a monitored software product from a diagnosis agent 401 deployed in the cloud environment is received, wherein each node in the cluster system has a diagnosis agent 401 deployed.

In optional step 802, by analyzing the report of the problem, it is determined whether to replicate the entire environment of the software product. In response to the determination of yes, the entire environment including software product is captured, and the environment is deployed in the diagnosis cloud.

According to an embodiment of the present invention, it is determined whether to replicate the entire environment of the software product according to the data collected from the nodes and the predefined rules of the diagnosis controller; and in response to the determination of yes, the entire environment including the software product is captured, and the environment is deployed in the diagnosis cloud. That is to say, the step 802 may be realized through the diagnosis configuration data for the diagnosis controller 402 (as shown in Table 2). The diagnosis configuration data may include a trigger condition and corresponding action. The trigger condition may include a fatal exception or a specific trace pattern. The corresponding action may include determining or initiating replicating the entire environment of the software product. When the report from the diagnosis agent 401 matches such a trigger condition, the corresponding action is executed, i.e., determining to replicate the entire environment of the software product. The corresponding action may also include instructing the diagnosis agents 401 deployed on other nodes to submit reports on the same problem, and the corresponding actions correspond to a specific trace pattern which is used as the trigger condition.

According to an embodiment of the present invention, the capturing the entire environment including the software product and deploying the environment in the diagnosis cloud comprises the following steps:

In optional step 803, the image of each node in the cluster environment of the software product is captured.

In an embodiment of the present invention, the diagnosis controller 402 may store the captured image of each node in an image repository 404.

In optional step 804, relevant configuration data for the cluster system deployed in the cloud environment is collected from the diagnosis agent 401 deployed on each node in the cluster system. The relevant configuration data may also be referred to as system pattern metadata (e.g., as shown in Table 3). The system pattern metadata may be collected in real time by the diagnosis agent 401 during its operation. The diagnosis agent 401 may provide in real time the collected system pattern metadata to the diagnosis controller 402 to be received by the diagnosis controller, or may store it on the node, to be uniformly collected by the diagnosis controller 402 when replicating the cluster system.

In step 805, the image of each node is deployed in the diagnosis cloud. In an embodiment of the present invention, the diagnosis controller 402 may deploy the image of each node from the image repository 404 in the diagnosis cloud.

According to the embodiments of the present invention, the relevant configuration data for the cluster system deployed in the cloud environment comprise: node configuration data, cluster database configuration data and node association configuration data.

In step 806, the relevant configuration data for the cluster system deployed in the cloud environment is used to configure each node in the diagnosis cloud to rebuild the cluster system in the diagnosis cloud. In this way, the cluster system rebuilt in the diagnosis cloud will be the same as the original cluster system, and can be used for problem reproduction and diagnosis.

In an embodiment of the present invention, in response to the determination of no in step 802, the method returns to step 801 to instruct diagnosis agents 401 deployed on other nodes to submit reports on the same problem.

In an embodiment of the present invention, the diagnosis controller 402 may first combine the system pattern metadata collected from the diagnosis agents 401 on the respective nodes to generate a system pattern, and may store it in the diagnosis configuration repository 403 or a separate system pattern repository. The diagnosis controller 402 may coordinate the diagnosis agents 401 on the respective nodes in the diagnosis cloud (since the diagnosis agents may also be replicated along with node images) to perform system recovery. Each diagnosis agent 401 may obtain the corresponding system pattern data from the diagnosis configuration repository 403 or the system pattern repository to restore the node configurations. Of course, the diagnosis controller 402 may also perform system recovery by itself.

As known by those skilled in the art, in some embodiments of the present invention, the methods described above and shown respectively in FIG. 7 and FIG. 8 for diagnosing a problem of a software product running in a cloud environment may actually be combined into a single method for diagnosing a problem of a software product running in a cloud environment. In addition, the methods described above and shown respectively in FIG. 7 and FIG. 8 may have more, less or different steps, and the relationships of sequence, inclusion, function, etc. among the steps may be different from that is described and shown.

Figure 9:
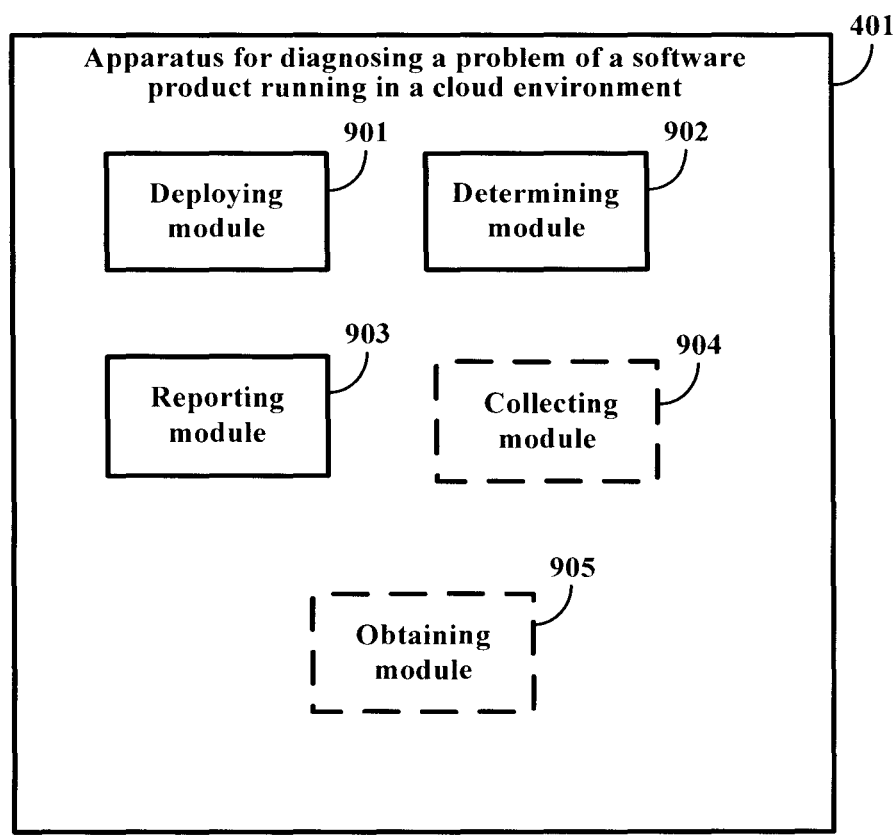
FIG. 9 shows an apparatus for diagnosing a problem of a software product running in a cloud environment according to some preferred embodiments of the present invention.

FIG. 9 shows an apparatus for diagnosing a problem of a software product running in a cloud environment according to some preferred embodiments of the present invention, the software product operating in a cluster system in a testing cloud or a customer cloud, and the apparatus comprises:

a deploying module 901 configured to, in response to a node joining the cloud environment, deploy a diagnosis agent on the node;

a determining module 902 configured to determine by the diagnosis agent whether a problem in the operation of the software product occurs;

a reporting module 903 configured to, in response to determining that a problem in the operation of the software product occurs, report to a diagnosis controller 402 by the diagnosis agent.

According to an embodiment of the present invention, the apparatus further comprises an optional collecting module 904 configured to collect relevant configuration data for a cluster system deployed in the cloud environment, and send the relevant configuration data for the cluster system deployed in the cloud environment to the diagnosis controller 402.

According to an embodiment of the present invention, the apparatus further comprises: an optional obtaining module 905 for obtaining diagnosis configuration data including a trigger condition, and wherein the determining module 902 configured to determine whether a problem in the operation of the software product occurs is further configured to: determine whether the output of the software product operation matches the trigger condition.

According to an embodiment of the present invention, the trigger condition includes an exception and/or a trace pattern in the operation of the software product.

According to an embodiment of the present invention, the relevant configuration data for the cluster system deployed in the cloud environment includes: node configuration data, cluster database configuration data and node association configuration data.

According to an embodiment of the present invention, the diagnosis configuration data further include an action corresponding to the trigger condition, and the reporting module 903 configured to report to, in response to determining that a problem in the operation of the software product occurs, report to the diagnosis controller 402 further comprises: means for, in response to determining that the output of the software product operation matches the trigger condition, executing the action corresponding to the matched trigger condition.

According to an embodiment of the present invention, the reporting module 903 configured to, in response to determining that a problem in the operation of the software product occurs, report to the diagnosis controller further comprises: means for communicating with the diagnosis agents 401 on other nodes in the cluster system to obtain operation conditions of the software product monitored by the diagnosis agents 401 on the other nodes.

Figure 10:
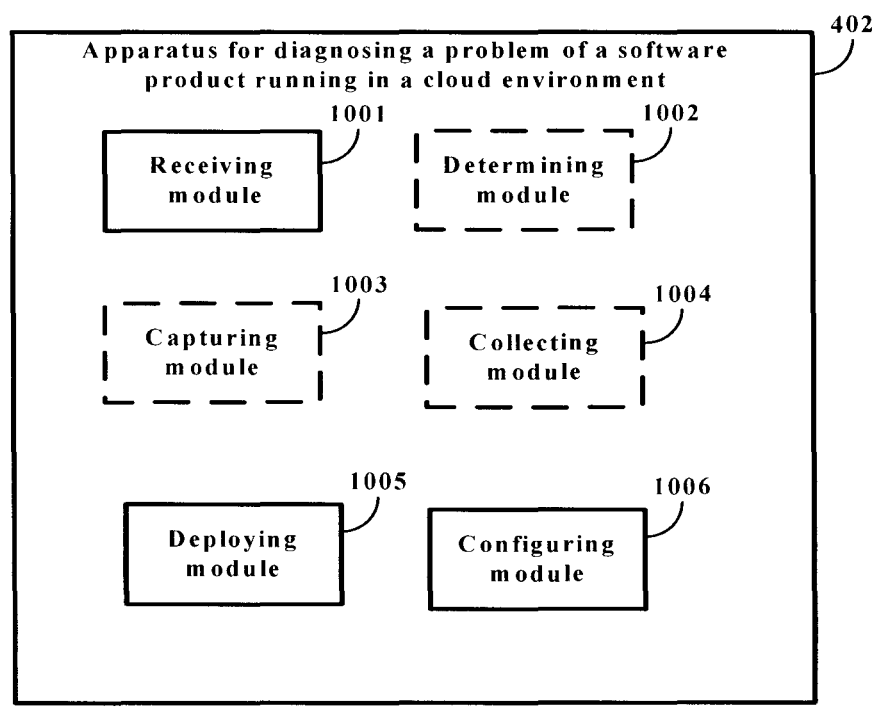
FIG. 10 shows an apparatus for diagnosing a problem of a software product running in a cloud environment according to some other preferred embodiments of the present invention.

FIG. 10 shows an apparatus for diagnosing a problem of a software product running in a cloud environment according to some other preferred embodiments of the present invention, and the apparatus may be referred to as a diagnosis controller 402, which comprises:

a receiving module 1001, configured to receive a report on a problem in the operation of a monitored software product from a diagnosis agent 401 deployed in each node of a testing cloud or customer cloud;

a deploying module 1005 configured to deploy the image of each node of the cloud environment in the diagnosis cloud; and a configuring module 1006 configured to apply corresponding configuration data for a cluster system deployed in the cloud environment to configure each node in the diagnosis cloud, so as to rebuild the cluster system in the diagnosis cloud.

According to an embodiment of the present invention, the apparatus further comprises:

an optional capturing module 1003 configured to capture the image of each node in the cluster system of the software product; and an optional collecting module 1004 configured to collect relevant configuration data for the cluster system deployed in the cloud environment from the diagnosis agent 401 deployed on each node in the cluster system;

According to an embodiment of the present invention, the relevant configuration data for the cluster system deployed in the cloud environment comprises: node configuration data, cluster database configuration data and node association configuration data.

According to an embodiment of the present invention, the apparatus further comprises the following optional module:

a determining module 1002 configured to determining whether to replicate the entire environment of the software product according to the data collected from the nodes and the predefined rules of the diagnosis controller;

and wherein, the capturing and deploying module is configured to, in response to the determination of yes, capture the entire environment including the software product, and deploy the environment in the diagnosis cloud.

As known by those skilled in the art, in some embodiments of the present invention, the apparatuses described above and shown respectively in FIG. 9 and FIG. 10 for diagnosing a problem of a software product running in a cloud environment may actually be merged into a single system for diagnosing a problem of a software product running in a cloud environment. In addition, the apparatuses described above and shown in FIG. 9 and FIG. 10 may have more, less or different modules, and the relationships of connection, inclusion and function among the modules may be different from that is described.

It should be pointed out that names of the diagnosis agent, diagnosis controller and the modules in the apparatuses in the description and the appended claims are merely for the convenience of narration, and do not have any limitation to the technical solutions of the present invention.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for diagnosing a problem of a software product running in a cloud environment, comprising:

receiving in a diagnosis controller a problem in the operation of the monitored software product from a first diagnosis agent deployed on a first node in the cloud environment;

capturing the cloud environment including the software product, wherein capturing the cloud environment including the software product comprises: capturing a respective image of each of a plurality of nodes of the cloud environment which support the software product using a respective diagnosis agent deployed in each of the plurality of nodes and communicating the respective image to the diagnosis controller, and collecting relevant configuration data for a cluster system deployed in the cloud environment from the respective diagnosis agent deployed on each node of the plurality of nodes and communicating the relevant configuration data to the diagnosis controller;

using the diagnosis controller to deploy the captured cloud environment in a diagnosis cloud separate from the cloud environment, wherein deploying the captured cloud environment in a diagnosis cloud comprises: deploying the image of each node of the plurality of nodes of the cloud environment in a respective corresponding node of the diagnosis cloud, and applying the corresponding configuration data for the cluster system deployed in the cloud environment to configure each node in the diagnosis cloud; and using the diagnosis cloud to reproduce the problem in the operation of the monitored software product.

2. The method of claim 1, wherein the relevant configuration data for the cluster system deployed in the cloud environment comprises: node configuration data, cluster database configuration data and node association configuration data.

3. The method of claim 1, wherein it further comprises:

determining whether to replicate the entire cloud environment of the software product according to the data collected from the nodes and predefined rules of the diagnosis controller of the cloud environment; and in response to the determination of yes, capturing the entire cloud environment including the software product and deploying the cloud environment in the diagnosis cloud.

4. The method of claim 1, further comprising:

in response to a node joining the cloud environment, deploying a diagnosis agent on the node.

5. The method of claim 1, further comprising:

sending diagnosis configuration data from the diagnosis controller to the first diagnosis agent, the diagnosis configuration data including a trigger condition, wherein the first diagnosis agent determines whether a problem in the operation of the software product occurs by determining whether the output of the software product operation matches the trigger condition.

6. The method of claim 5, wherein the trigger condition includes an exception and/or a trace pattern in the operation of the software product.

7. The method of claim 5, wherein the diagnosis configuration data further comprises an action corresponding to the trigger condition, and in response to the first diagnosis agent determining that the output of the software product operation matches the trigger condition, executing the action corresponding to the trigger condition.

8. The method of claim 5, wherein in response to the first diagnosis agent determining that the output of the software product operation matches the trigger condition, the first diagnosis agent communicates with the diagnosis agents on other nodes in the cloud environment to obtain operation conditions of the software product monitored by the diagnosis agents on the other nodes.

9. The computer system server acting as a diagnosis controller of claim 1, wherein the diagnosis controller program further cause the computer system server to:
determine whether to replicate the entire cloud environment of the software product according to the data collected from the nodes and predefined rules of the diagnosis controller of the cloud environment; and
in response to the determination of yes, capture the entire cloud environment including the software product and deploy the cloud environment in the diagnosis cloud.

10. The computer system server acting as a diagnosis controller of claim 1, wherein the diagnosis controller program further cause the computer system server to:
send diagnosis configuration data to the first diagnosis agent, the diagnosis configuration data including a trigger condition, wherein the first diagnosis agent determines whether a problem in the operation of the software product occurs by determining whether the output of the software product operation matches the trigger condition.

11. The computer system acting as a diagnosis controller of claim 10, wherein the trigger condition includes an exception and/or a trace pattern in the operation of the software product.

12. The computer system acting as a diagnosis controller of claim 10, wherein the diagnosis configuration data further comprises an action corresponding to the trigger condition, and in response to the first diagnosis agent determining that the output of the software product operation matches the trigger condition, the action corresponding to the trigger condition is executed.

13. A computer system server acting as a diagnosis controller for diagnosing a problem of a software product running in a cloud environment, comprising:
a memory;
at least one processing unit for executing instructions storable in said memory;
a diagnosis controller program embodied as instructions storable in the memory and executable on the at least one processing unit, which cause the computer system server acting as a diagnosis controller to:
receive a problem in the operation of the monitored software product from a first diagnosis agent deployed on a first node in the cloud environment;
capture and store a cloud environment including the software product, the cloud environment being captured by capturing a respective image of each of a plurality of nodes of the cloud environment which support the software product using a respective diagnosis agent deployed in each of the plurality of nodes and communicating the respective image to the diagnosis controller, and collecting relevant configuration data for a cluster system deployed in the cloud environment from the respective diagnosis agent deployed on each node of the plurality of nodes and communicating the relevant configuration data to the diagnosis controller;
deploy the captured cloud environment in a diagnosis cloud separate from the cloud environment, wherein deploying the captured cloud environment in a diagnosis cloud comprises: deploying the image of each node of the plurality of nodes of the cloud environment in a respective corresponding node of the diagnosis cloud, and applying the corresponding configuration data for the cluster system deployed in the cloud environment to configure each node in the diagnosis cloud;
wherein the diagnosis cloud is used to reproduce the problem in the operation of the monitored software product.

14. The computer system server acting as a diagnosis controller of claim 13, wherein the relevant configuration data for the cluster system deployed in the cloud environment comprises: node configuration data, cluster database configuration data and node association configuration data.

* * * * *